United States Patent [19]
Schwärzler et al.

[11] 3,804,022
[45] Apr. 16, 1974

[54] ELECTROMAGNETIC SUSPENSION AND GUIDE SYSTEM FOR MAGNETICALLY SUSPENDED VEHICLES

[75] Inventors: Peter Schwärzler, Furstenfeldbruck; Gerhard Bohn; Helmut Schauberger, both of Munich, all of Germany

[73] Assignee: Krauss-Maffei Aktiengesellschaft, Munchen, Germany

[22] Filed: June 30, 1972

[21] Appl. No.: 268,132

[30] Foreign Application Priority Data
July 9, 1971  Germany............................ 2134424

[52] U.S. Cl........................................... 104/148 MS
[51] Int. Cl............................................ B61b 13/08
[58] Field of Search................ 104/148 MS, 148 SS

[56] References Cited
FOREIGN PATENTS OR APPLICATIONS
707,032   5/1941   Germany..................... 104/148 MS Primary Examiner—Gerald M. Forlenza
Assistant Examiner—George H. Libman
Attorney, Agent, or Firm—Karl F. Ross; Herbert Dubno

[57] ABSTRACT

A vehicle displaceable along a track is suspended by at least one electromagnetic suspension and guide system comprising a generally U-section armature fixedly mounted along the track and having downwardly extending flanges. The vehicle is provided with a plurality of magnetic cores and respective electromagnet coils axially spaced in the direction of vehicle travel and in the longitudinal direction of the track with the cores being staggered to one side and the other alternately in the longitudinal direction. The cores are likewise of U-section and have flanges with a spacing equal to that of the flanges of the armature. When staggered as specified, the flanges of one core set lie to one side of vertical planes through the armature flanges while the next core set has its flanges lying to the other side of these planes.

10 Claims, 8 Drawing Figures

3,804,022

ELECTROMAGNETIC SUSPENSION AND GUIDE SYSTEM FOR MAGNETICALLY SUSPENDED VEHICLES

FIELD OF THE INVENTION

The present invention relates to an electromagnetic suspension and guide system for a suspended vehicle (e.g. an aerial tramway) and, more particularly, to improvements in magnetic suspension and guide arrangements for free floating bodies, especially personnel-carrying vehicles.

BACKGROUND OF THE INVENTION

In recent years efforts have been made to avoid the disadvantages of various vehicle systems, especially those used for mass high-speed transporation, by reducing friction and suspending the vehicle body along a track or right of way.

In prior mass transportation systems, for example, whether of the conventional railroad or monorail type, the vehicle structure generally was supported by wheels which rollingly engaged a track along the right of way. The system was driven by an electric motor or other source connected to the wheels by frictional engagement of the wheels with the track. Other systems are, of course, known including those which use a cable, endless belt or chain for driving the vehicle, those which employ cogwheels and the like and systems which power the vehicle by fluid means, e.g. by a reaction against air or by application of a fluid pressure differential across the vehicle. In all of these systems, the frictional engagement of the wheel with a supporting surface limits the speed of the vehicle, provides wear of the many moving parts and renders the system prone to break down. Even arrangements in which improved bearings, rubber tires, or coated rails are provided have not been found to be wholly satisfactory for mass transportation systems.

To avoid the problem of friction-supported vehicles, it has been proposed to provide a suspension of the vehicle, i.e. to maintain an air gap between the vehicle and a supporting surface, e.g. by forcing air at high pressure into the gap or by providing a magnetic suspension. The former system has the disadvantage that it requires considerable volumes of air at high pressure, thereby producing considerable noise.

The suspension and guide arrangement of the present invention deals with electromagnetic systems for suspending a vehicle from a track along which the vehicle may be displaced by such means as a linear-induction motor system or some other power source. Linear-induction drive systems for such vehicle, track arrangements and vehicle systems have been proposed heretofore and are in use in many places.

Conventional electromagnetic suspension and guide systems, which also may be used to displace the vehicle, generally comprise rows of magnets on opposite sides of the vehicle median plane through the vehicle in the direction of travel. Each magnet generally comprises a core surrounded by a coil and juxtaposed with an armature on the supporting track through which the flux path is crossed. In these systems, lateral guidance required additional sets of magnets which added to the expense and waste of the suspension system and to that extent reduced the versatility and load-carrying capacity of the vehicle.

OBJECTS OF THE INVENTION

It is the principal object of the present invention to provide an improved electromagnetic suspension and guide system for floating vehicle and the like displaceable along a support (hereinafter described as a track) whereby the disadvantages of earlier systems can be obviated.

Another object of the invention is to provide a floating magnetically supported vehicle with increased load carrying capacity, reduced cost and improved lateral stability.

A further object of the invention is to provide a magnetic suspension and guide system which eliminates the need for separate lateral guide and vertical suspension magnets on a vehicle of the character described.

SUMMARY OF THE INVENTION

These objects are attained with an electromagnetic suspension and guide-system for aerial tramways and other suspended-vehicle systems which comprises a track or the like defining a generally horizontal right-of-way for a vehicle body, and an armature rail extending longitudinally along this track and preferably having a U-section. According to an important feature of the invention, a plurality of electromagnets, carried by the vehicle body, extending along the rail in juxtaposition therewith in the direction of travel of the vehicle. The electromagnets are thus carried by the floating or suspended member of the system. The electromagnets have cores which form closed magnetic paths through two or more air gaps with the armature rail and, according to the invention, the cores of the electromagnets cooperating with a particular armature rail lie in two rows which are transversely offset from one another.

More particularly, alternate electromagnets in the direction of travel of the vehicle are offset to one side and the other laterally of the armature and thus affect the armature and are magnetically affected thereby alternately in opposite directions. The two rows or sets of electromagnets may be separably controlled and to this end can be provided with respective coils. The confronting faces of the magnet core, which define the air gaps with the armature, preferably are inclined to the horizontal and the armature surfaces corresponding thereto can be similarly inclined. The inclined faces can be formed by separate or unitary pole shoes.

When two groups or rows of electromagnets according to the invention serving as the suspension and guide electromagnets of the system are staggered to either side of a median plane through the armature with which they cooperate, the algebraic summation of the lateral magnetic forces produced by the two sets of electromagnets nullify each other in the median position of the vehicle and hence a balanced or equilibrium position can be obtained in which any external lateral force can be counteracted by a self-generated lateral magnetic force.

Best results are obtained when the magnets are disposed alternately to one side and the other of a plane through a shank or flange of the armature with which the corresponding shanks or flanges of the electromagnets cooperate but nevertheless within the projection of the flange or pole of the armature on a plane perpendicular to the suspension force. This overlap of the projections of the core poles and the armature poles ensures generation of compensating forces upon deflection of the suspended electromagnetic system by the lateral centrifugal or wind forces.

Since the electromagnets of the two groups can be energized separately, it is simple to control the overall magnetic forces and those which provide a resultant either to the left or to the right for guiding the vehicle.

According to another feature of the invention, each of the electromagnets has a U-profile or section and is provided along its flanges with a respective coil. The pole faces at the free ends of the flanges are inclined as noted earlier and the inter-flange center-to-center spacing may equal the center-to-center spacing of the flanges of the armature. The two sets of magnets may be laterally offset by an amount equal at most to the transverse width of the core flanges or the armature flanges, whichever is larger.

DESCRIPTION OF THE DRAWING

The above and other objects features and advantages of the present invention become more readily apparent from the following description, reference being made to the accompanying drawing in which.

SPECIFIC DESCRIPTION

Figure 7:
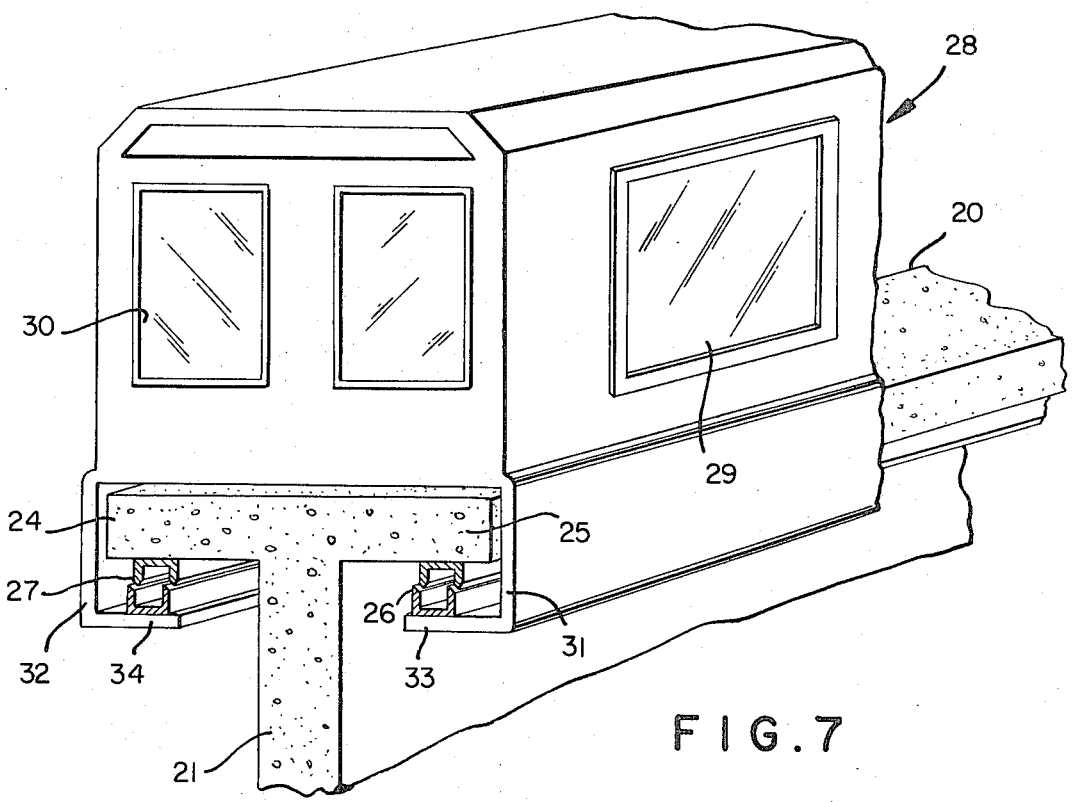
FIG. 7 is a diagrammatic perspective view of a suspended railway showing the location of the suspension system.

Referring first to FIG. 7, it will be seen that an aerial tramway, railway or other suspended vehicle system according to the present invention may comprise an elevated support 20 mounted upon pylons or posts 21 and generally of T-shaped cross-sections with a crossbar 23 whose arms 24 and 25 are provided along their underside with inverted U-section rails 26 and 27 corresponding to the magnetic armatures according to the present invention.

The inverted-U-rails 26 and 27 are composed of ferromagnetic material (e.g. iron) and are fixed to the support. A personnel-carrying vehicle structure, represented generally at 28, may comprise a cabin 29 for personnel to be transported along the track defined by the support 20. A cabin 30 may also be provided in this vehicle to hold the driver or to control it. The vehicle may be powered by any conventional means including, and preferably, a linear-induction motor, although other motive sources, preferably of the nonfriction type, may also be used. The vehicle comprises a pair of depending aprons 31 and 32 having inwardly turned flanges 33 and 34 respectively carrying rows of suspending magnets, each row consisting of two offset subrows and will be apparent from FIGS. 1 – 6.

Figure 8:
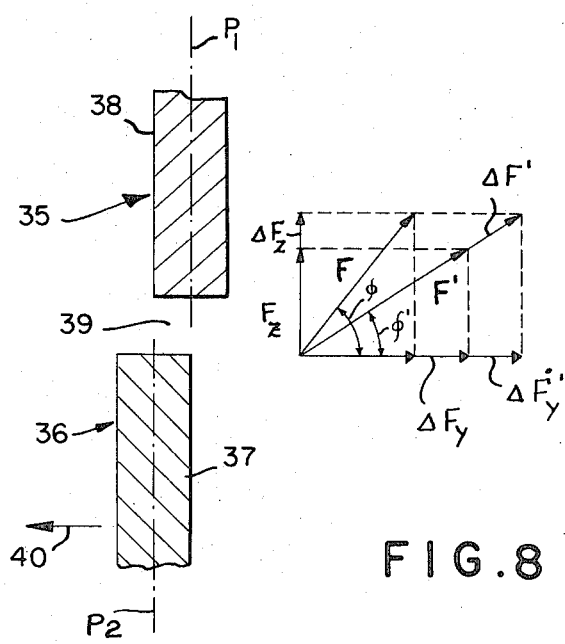
FIG. 8 is a diagram illustrating forced relationship according to the invention.

In FIG. 8, the principles of the present invention are shown in somewhat greater detail. More specifically, the armature 6 affixed to the support has a depending flange 35 with respect to which the upstanding flange of a magnetic core 36 is offset to one side or another. In the embodiment illustrated in FIG. 8, flange 36 is offset to the left with respect to the median plane $P_1$ extending through the flange 35. Where the flanges 35 and 36 are approximately the same width, the flange $P_1$ may coincide with the right-hand flank 37 of the flange 36 while the left-hand flank 38 of the flange 35 may coincide with the vertical median plane $P_2$ through flange 36. When a magnetic field closest to the airgap 39 between the flanges, a force resultant F is produced which, as shown in FIG. 8, extends to the right, tending to support the vehicle 28 and prevent downward or lateral movement thereof. More specifically, the force F has a vertical or supporting component $F_z$ and a guiding or positioning component in the horizontal direction represented at $F_y$. The force acts at an angle $\Phi$ to the horizontal or an angle $(90° - \Phi)$ to the vertical. Should an extraneous force, acting in the direction of arrow 40, tend to urge the vehicle 28 to the left and therefore shift the flange 36 to the left (centrifugal force) the angle $\Phi$ tends to diminish, e.g. to the angle $\Phi'$. With a constant electromagnetic field intensity, the resultant force $F'$ will remain equal to the force F although the horizontal attractive component $F_y$ will be increased by the increment $\Delta F_y$ while the vertical suspending force is reduced by the increment $\Delta F_z$. This additional force will urge the vehicle back into its neutral or mean position as will be described below. The remaining vertical component $F_z$ minus $\Delta F_z$ should be sufficient to support the vehicle. In the event the restoring force $F_y + \Delta F_y$ is insufficient, the magnetic field strength may be increased to raise the resultant force $F'$ by the increment $\Delta F'$, thereby increasing the upward component $F_z$ as well as the horizontal component, the latter to the total force $F_y + \Delta F_y + \Delta F_y'$.

Figure 1:
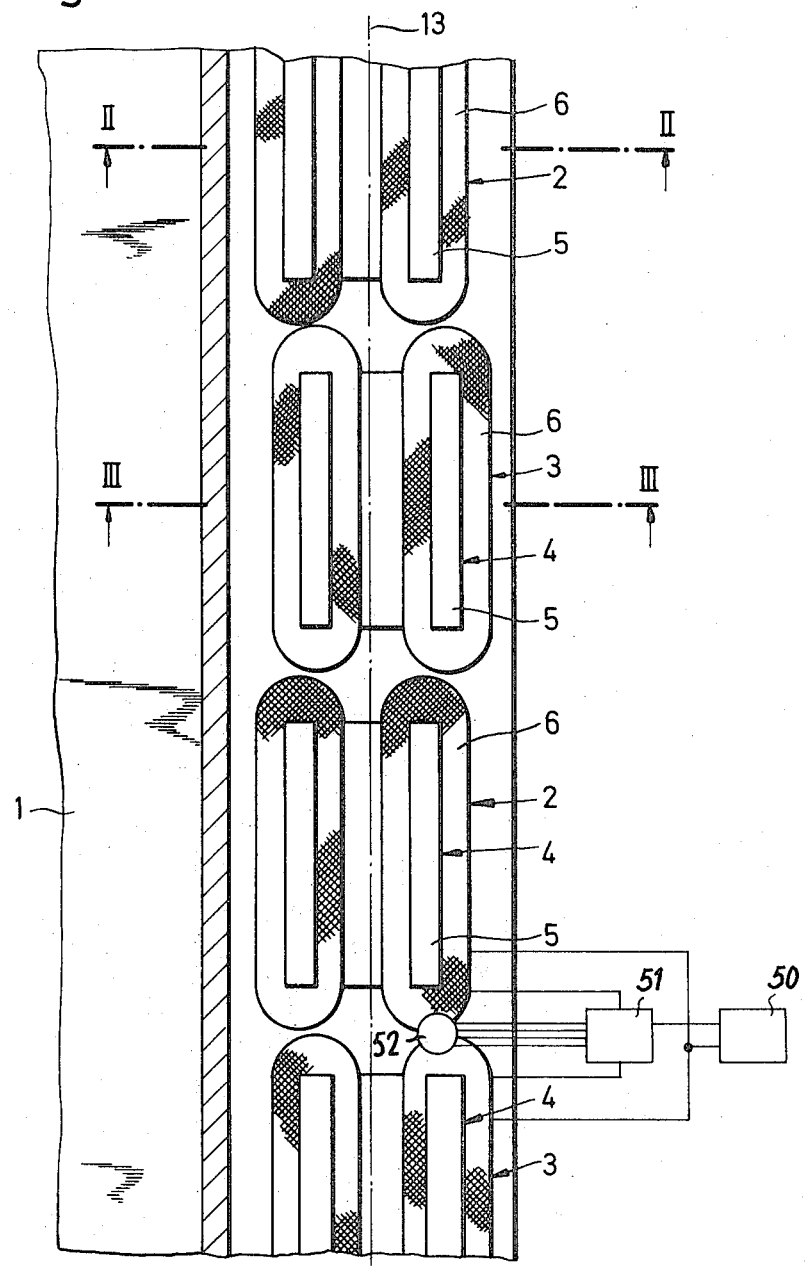
FIG. 1 is a schematic plan view, partly in cross-section, representing a fragment of an aerial tramway with suspended vehicle according to the present invention at the magnetic suspension side thereof.
Figure 2:
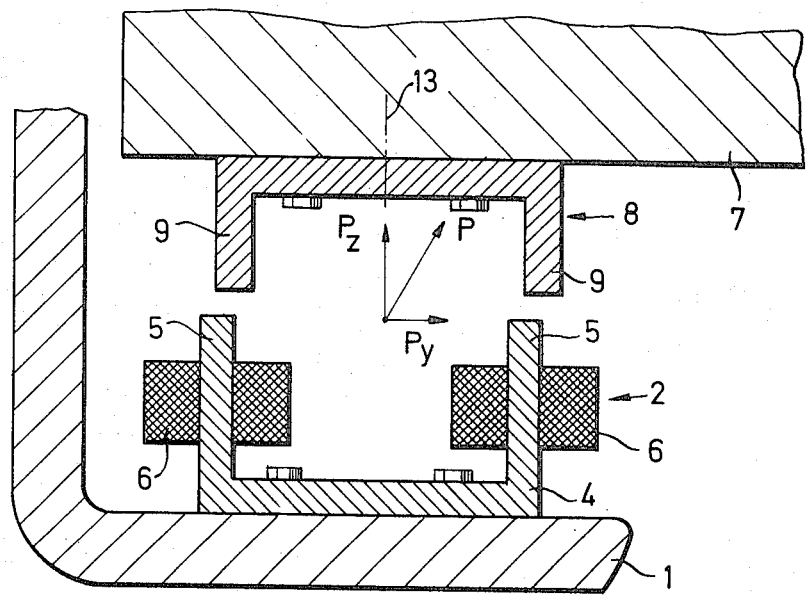
FIG. 2 is a section taken along the line II — II of FIG. 1.
Figure 3:
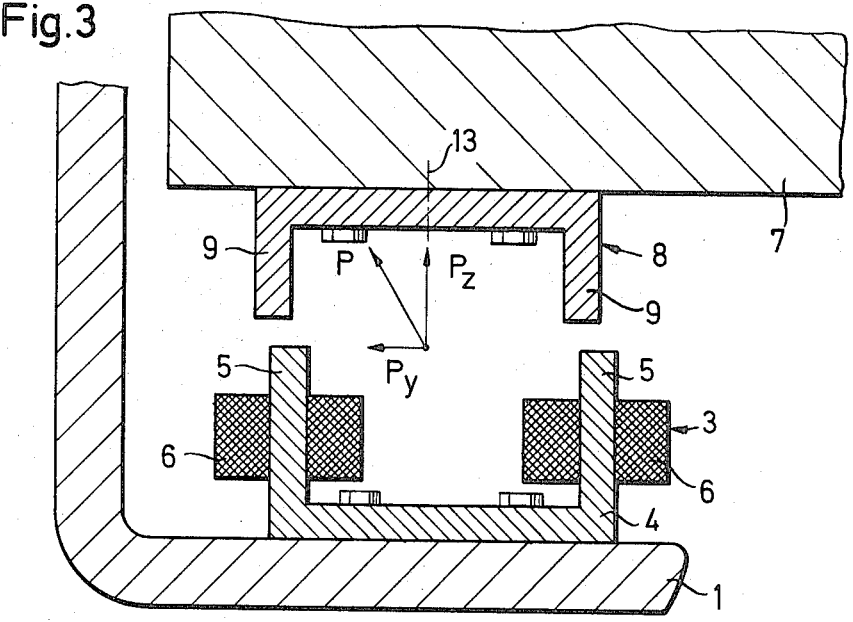
FIG. 3 is a section taken along the line III — III of FIG. 1.

In FIGS. 1 – 3, there is shown a suspended vehicle 1, only one side of which has been illustrated. The vehicle is provided on both outer flanks of its under carriage with respective suspension and guide arrangements only one of which has been shown in FIGS. 2 and 3, each such arrangement comprising a row of magnets 2 and 3 which are alternately offset in the longitudinal direction and are spaced apart in the direction of travel of the vehicle (see FIG. 1). The cores 4 of ferromagnetic material of the magnets 2 and 3 are of U-shaped configuration or channel profile, the flanges 5 of these cores extending vertically and reaching towards a support structure represented at 7. Each of these flanges 5 carries an electromagnet coil 6 which may be energized from a source 50, the exciting current being controlled by a control system 51 which may be connected with gap detectors 52. The source 50 and the control system 51 and a gap detector 52 have been shown only diagrammatically since controls of this type are well known in the art. On the underside of the supporting track 7, along both arms thereof, is provided an armature 8 which is fixed and also composed of ferromagnetic material. Only one of the armatures has been shown in FIGS. 2 and 3, although both armatures can be seen in FIG. 7. The armature 8 is a downwardly open channel and thus of inverted-U cross-section with a similar center-to-center spacing of its flanges 9 and the spacing between the flanges 5. Thus the flanges 9 extend downwardly toward the oppositely extending flanges 5 with the faces of the flanges confronting where the flanges overlap in projection on a horizontal plane lying between them.

Under the influence of the magnetic field applied to both armatures 8 (on opposite sides of a vertical median plane to the vehicle), the vehicle is floatingly suspended electromagnetically. Any propulsion systems may be used as previously described.

The magnets 2 and 3 of each row are not aligned nor do they register precisely with the armature in the median or normal position of the vehicle as is the case with conventional magnetic support systems. These systems require a separate guide arrangement and additional magnets for this purpose. In the present case, the magnets in the direction of travel of the vehicle alternately are offset to the right and to the left with respect to the vertical median plane 13 of the armature. The magnets 3 are shown to be offset to the right (see FIGS. 1 and 3) while the magnets 2 are offset to the left (FIGS. 1 and 2.) Because of this offset arrangement, the resultant force P generated by each of the magnets between the respective core and the common armature 8 does not run vertically but rather is inclined so that the resultant P extends upwardly and to the left in the case of the magnet 3 and upwardly to the right in the case of the magnet 2. Each of these resultant forces can be resolved into the component $P_z$ and $P_y$, the former being the vertical or suspension component while the latter is a horizontal or guide component. The horizontal component $P_y$ of the magnets 2 acts in one direction, i.e. to draw the vehicle to the right in the case of the magnets 2 of FIG. 1 while the magnets 3 of FIG. 3 tend to draw the vehicle to the left. The horizontal force components $P_y$, in algebraic summation along any row of the alternately offset magnets are thus zero when the vehicle is in the normal or symmetrical position with respect to the vertical median plan through the support 7. The magnet system is so arranged that, in the absence of external forces upon the vehicle (for example the centrifugal force generated upon travel of the vehicle around a curve), the vehicle will lie in its normal or central position and the sum of all of the horizontal force component $P_y$ will be algebraically equal to zero.

The degrees of offset to each side is so dimensioned that, with a deviation of the floating vehicle to one side or the other, e.g. by centrifugal force, wind pressure or the like, a resultant force is automatically generated which counteracts this deviation. When the compensating or counteracting force is insufficient, the corresponding coil may be energized (see elements 50, 51 and 52 of FIG. 1) so that the horizontal component force in either direction can be modified to suit the lateral pressures applied to the vehicle. The coils of magnet 2 are energizable or controllable independently from the coils of magnet 3 as illustrated. During the reduction in the electromagnetic force generated by magnets 3, for example, the electromagnetic force produced by the oppositely offset magnets 2 can be increased to maintain a constant suspension force (resultant vertical component). Of course, by adjustment of the output of source 50 it is possible to simultaneously increase the electromagnetic forces of all magnets 2 and 3 and thereby increase the vestical suspension component. A reduction of this component can be effected in a similar manner. Usually both types of control, i.e. simultaneous control of the electromagnetic field strength of all magnets and individual control of the sets of magnets 2 and the sets of magnets 3 can be carried out simultaneously.

Figure 4:
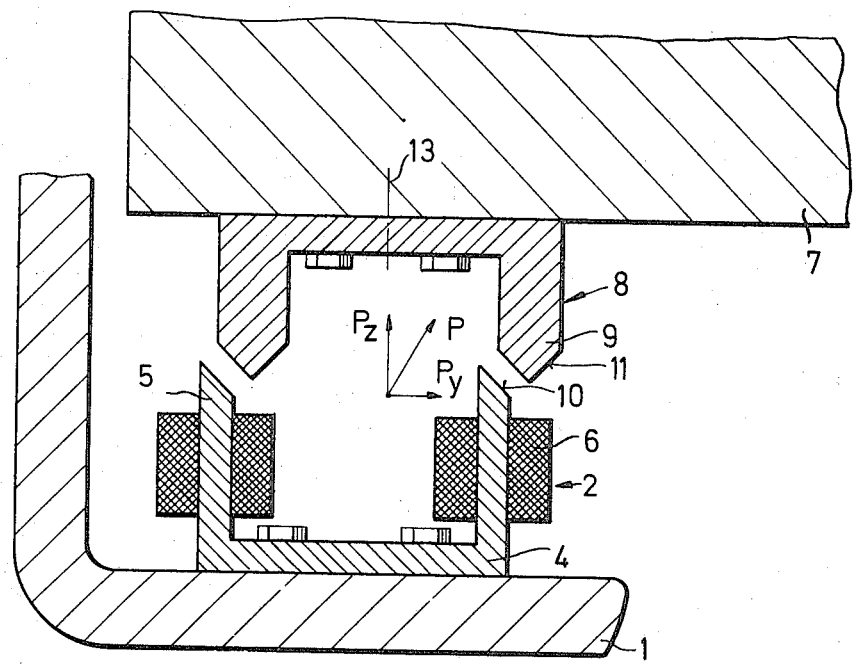
FIG. 4 is a cross-section corresponding to FIG. 2 but illustrating an armature having a different configuration.
Figure 5:
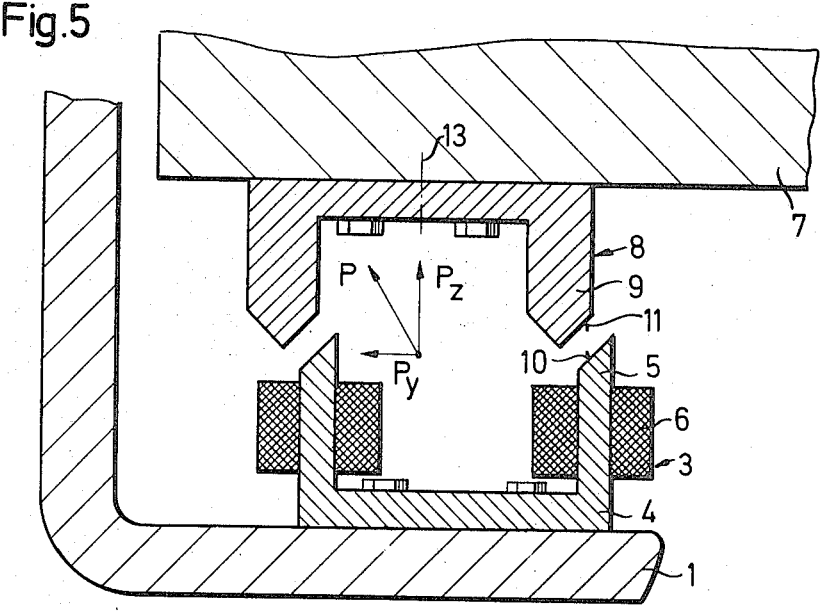
FIG. 5 is a view similar to FIG. 3 using the system of the type of FIG. 4.

In FIGS. 4 and 5, there is shown the suspension and guide assembly at the left-hand side of a vehicle, the assembly being substantially identical to that already described in connection with FIGS. 2 and 3 except for the configuration of the pole pieces.

In this embodiment, the armature 8 which is fixed to the support 7 has its flanges 9 provided with symmetrically inclined flanks 11 forming a downwardly tapered wedge, the flanks of which are symmetrical with the flange planes. The wedge-forming flanks may include angles of 90° with one another so that each flank lies at an angle of 45° to the horizontal.

The pole pieces or flanges 5 of the magnetic core of magnets 2 and 3, which are surrounded by electromagnets 6 and are secured via the webs 4 to the vehicle 1, are inclined at 10 at angles of 45° to the horizontal or vertical.

The magnets 2, which are offset to the left of the plane 13, have their inclined flanks facing to the right while the magnets 3, which are offset to the right (FIG. 5) have their inclined flanks 10 facing to the left.

Because of the opposite inclinations of the pole flanks of the oppositely offset magnets, the normal magnetic field path is primarily perpendicular to these flanks and the faces 11 of the armature 8. The system of FIGS. 4 and 5 has been found to be somewhat more effective than that of FIGS. 2 and 3 in providing a restoring force counter to any lateral displacement.

Figure 6:
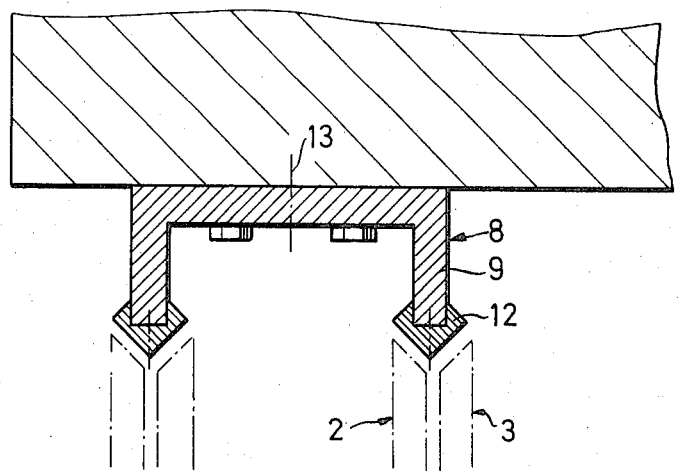
FIG. 6 is a cross-section corresponding to FIG. 2 or FIG. 3 and illustrating another embodiment of the invention with an armature provided with beveled shoes according to the invention.

In FIG. 6, we have shown an arrangement in which the magnet flanges of the cores of magnets 2 and 3 are represented in broken lines and the armature flanges 9 are provided with square-cross-section pole shoes 12, attached by bolts to the armature 8, and defining the inclined flanks corresponding to the flanks 11. The shoes 12 allow an increase in the cross-section of the pole and thus concentrate the magnetic field without materially increasing the overall mass of the rail 8. Enlargements such as that shown at 12 for the pole shoes may also be formed unitarily or in one piece on the armature 8.

The invention described and illustrated is believed to admit of many modifications which will be readily apparent to those of ordinary skill in the art and are intended to be included within the invention to the extent that they fall within the spirit and scope of the instant claims.

We claim:

1. A magnetic suspension and guide system for a vehicle adapted to travel along a support extending longitudinally in the direction of vehicle travel, the system comprising a fixed armature extending along its support; at least one row of electromagnet cores spaced longitudinally along said vehicle and fixed thereto, said cores having magnetic poles cooperating with poles of said armature, some of the cores of said row being offset laterally relative to the other cores of said row by less than the core width such that the cores have centers on opposite sides of a median plane of said armature; and electromagnetic coils cooperating with said cores to generate a magnetic flux bridging the poles of said cores and said armature to suspend said vehicle and guide the latter laterally along said support.

2. A magnetic suspension and guide system for a vehicle adapted to travel along a support extending longitudinally in the direction of vehicle travel, the system comprising a fixed armature extending along its support; a plurality of electromagnet cores spaced longitudinally along said vehicle and fixed thereto, said cores having magnetic poles cooperating with poles of said armature and being grouped in two sets forming respective rows in said direction, the cores of one set being offset laterally relative to the cores of the other set on opposite sides of a pole of said armature; and electromagnetic coils cooperating with said cores to generate a magnetic flux bridging the poles of said cores and said armature to suspend said vehicle and guide the latter laterally along said support, said armature having a generally U-shaped profile with a pair of vertically extending flanges reaching toward said cores, said cores being of generally U-shaped profile with respective flanges reaching toward the flanges of said armature, alternate ones of said cores forming each of said sets and constituting respective coils, the magnets of one set having their flanges offset horizontally to one side of these vertical median planes of the flanges of said armature.

3. The system defined in claim 2, further comprising means for separately controlling the electromagnetic field intensity of the magnets of said sets.

4. The system defined in claim 2 wherein the flanges of said cores have inclined faces turned generally toward the respective median plane of the flange of said armature.

5. The system defined in claim 4 wherein said flanges of said armature are formed with mutually inclined pole flanks generally parallel to the inclined faces of the pole of the force.

6. The system defined in claim 5 wherein the poles flanks of the flange of said armature are formed by pole pieces mounted upon said flanges of the armature and forming respective shoes.

7. The system defined in claim 2 wherein said vehicle is provided on each side of a vertical median plane through the vehicle and its support with a respective such armature and two sets of mutually offset magnets.

8. The system defined in claim 7 wherein the flanges of said cores have the same center-to-center spacing as the flanges of said armature.

9. The system defined in claim 8 wherein said flanges of said cores and said flanges of said armature have overlapping projections in a horizontal plane between said magnets and said cores in a normal median position of said vehicle which respect to said armature.

10. The system defined in claim 9 wherein said armature is a downwardly open channel and said cores are upwardly open channels.

* * * * *

UNITED STATES PATENT OFFICE
CERTIFICATE OF CORRECTION

Patent No. 3,804,022　　　　　　　　　Dated April 16, 1974

Inventor(s) Peter Schwarzler et al.

It is certified that error appears in the above-identified patent and that said Letters Patent are hereby corrected as shown below:

Column 6, line 58, "its" should read -- said --;

Column 7, line 25, change "these" to -- the --;

Column 8, line 8, change "force" to -- cores --;

Column 8, line 24, change "magnets" to -- armature --.

Signed and sealed this 10th day of December 1974.

(SEAL)
Attest:

McCOY M. GIBSON JR.　　　　　　　　C. MARSHALL DANN
Attesting Officer　　　　　　　　　　Commissioner of Patents